UNITED STATES PATENT OFFICE.

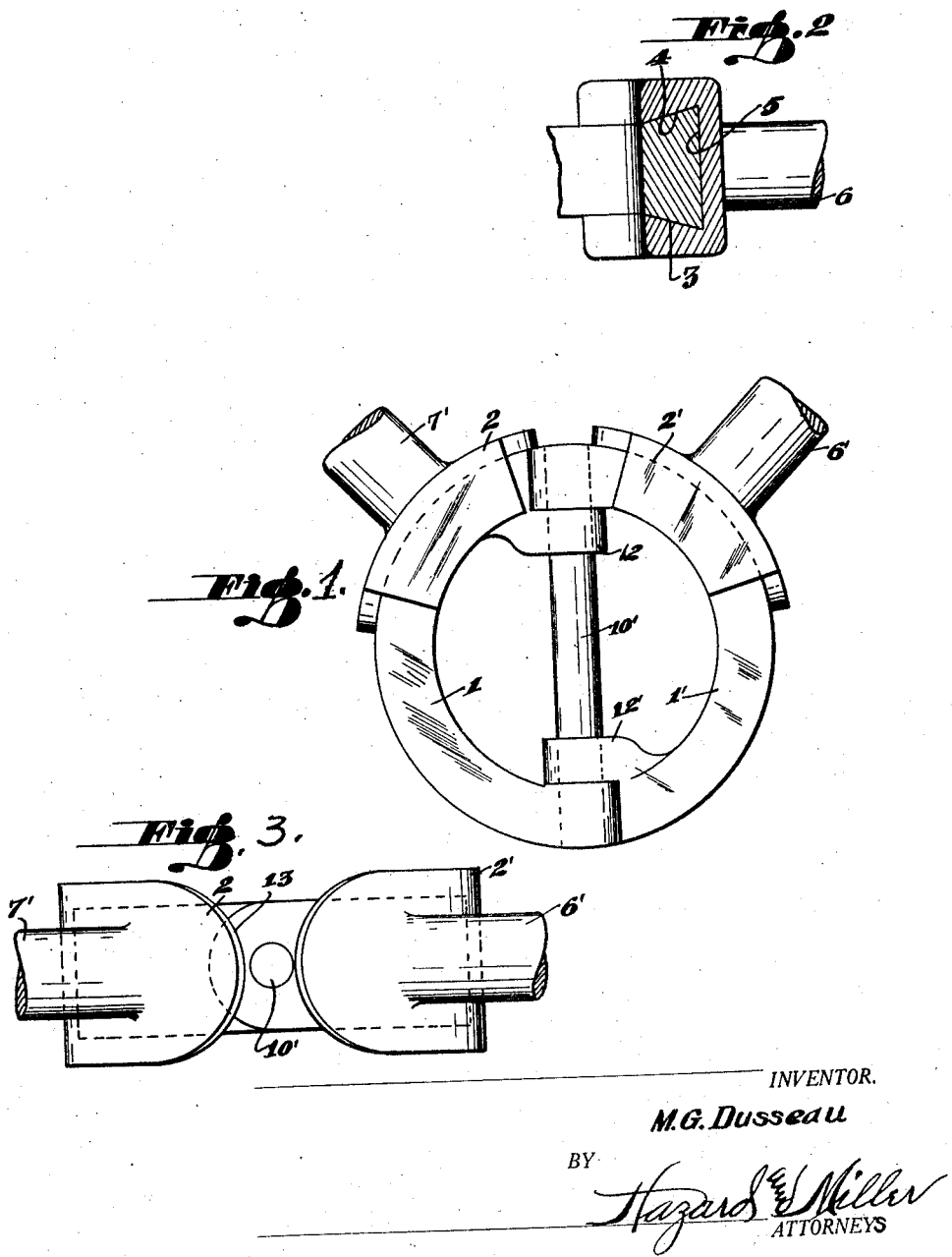

MAURICE G. DUSSEAU, OF LOS ANGELES, CALIFORNIA, ASSIGNOR OF ONE-TWENTIETH TO D. A. McDANIEL, OF LOS ANGELES, CALIFORNIA.

UNIVERSAL JOINT.

1,389,297. Specification of Letters Patent. Patented Aug. 30, 1921.

Application filed August 5, 1920. Serial No. 401,503.

*To all whom it may concern:*

Be it known that I, MAURICE G. DUSSEAU, a citizen of the United States, residing at Los Angeles, in the county of Los Angeles and State of California, have invented new and useful Improvements in Universal Joints, of which the following is a specification.

It is the object of the present invention to provide a universal joint, the members of which are normally positively held against disconnection, but which may be readily removed from one another when so desired.

The invention will be readily understood from the following description of the accompanying drawings, in which—

Figure 1 is a side elevation of the invention.

Fig. 2 is a detail transverse section through the same.

Fig. 3 is an edge view of the invention.

The universal joint comprises shafts 6' and 7' rigidly fixed to arcuate guide members 2 and 2'. Arcuate head members 1 and 1' are adapted to slide in the respective guide members 2 and 2', and the head members are provided with inclined side edges 3 coöperating with inclined sides 4 of the guideways 5 formed in the guide members.

The head members 1 and 1' are arranged with their ends overlapping to provide alined bearings through which extend a pivot pin 10'. As an instance of this arrangement one end of head 1' is shown as provided with an offset extension 12' overlapping the end of head 1 and the opposite end of head 1 is provided with a similar offset extension 12 overlapping the end of head 1'. The ends of the arcuate guide members are, preferably, curved as shown at 13, so that when the two guide members are slid upon the arcuate heads toward one another and are then swung relative to one another upon the pivot provided by pin 10, the arcuate guide plates and the shafts carried thereby may freely swing without abutment between the ends of the guide members.

The arcuate guide members are normally held against displacement relative to the arcuate heads by abutment of the ends of the arcuate members against one another. When, however, it is desired to disconnect the parts it is only necessary to remove pin 10' and each arcuate member may then be readily removed from its coöperating arcuate head.

It will be observed that this construction also provides a universal joint, since the shafts 6' and 7' are pivoted relative to one another by means of pin 10 and are also pivoted upon an axis at right angles thereto by means of the sliding engagement between the guide members and the arcuate heads.

Various changes may be made without departing from the spirit of the invention as claimed.

What is claimed is:

1. A universal joint including interchangeable arcuate members diametrically pivoted to one another and forming an annulus, and interchangeable arcuate members circumferentially slidable upon the pivoted arcuate members.

2. A universal joint including interchangeable arcuate members each forming a semi-circle, said members having bearings at one pair of opposite ends thereof and having offset extensions forming bearings at the other pair of opposite ends, a pivot rod journaled in said bearings for diametrically pivoting said members, and interchangeable arcuate members circumferentially slidable upon the pivoted arcuate members.

In testimony whereof I have signed my name to this specification.

MAURICE G. DUSSEAU.